(12) United States Patent
Naser et al.

(10) Patent No.: US 11,385,620 B2
(45) Date of Patent: Jul. 12, 2022

(54) METHOD FOR OPERATING AN AUTOMATION SYSTEM AND AUTOMATION SYSTEM USING MODIFIED SHARED DATA ACROSS MULTIPLE CONTROL DEVICES

(71) Applicant: OMRON Corporation, Kyoto (JP)

(72) Inventors: Mohammad Naser, Hoofddorp (NL); Dingeman Knaap, Hoofddorp (NL); Mariya Yurchenko, Hoofddorp (NL)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/981,291

(22) PCT Filed: Mar. 22, 2019

(86) PCT No.: PCT/IB2019/020004
§ 371 (c)(1),
(2) Date: Sep. 16, 2020

(87) PCT Pub. No.: WO2019/207365
PCT Pub. Date: Oct. 31, 2019

(65) Prior Publication Data
US 2021/0003995 A1   Jan. 7, 2021

(30) Foreign Application Priority Data

Apr. 23, 2018   (EP) .................................. 18168845

(51) Int. Cl.
*G05B 19/4155* (2006.01)
*G06N 5/02* (2006.01)

(52) U.S. Cl.
CPC .......... *G05B 19/4155* (2013.01); *G06N 5/02* (2013.01); *G05B 2219/31368* (2013.01); *G05B 2219/36046* (2013.01)

(58) Field of Classification Search
CPC ...... G05B 19/4155; G05B 2219/36046; G05B 2219/31368; G05B 19/0426;
(Continued)

(56) References Cited

U.S. PATENT DOCUMENTS

| | | | |
|---|---|---|---|
| 2013/0226317 A1* | 8/2013 | Vijayaraghavan | G06Q 10/06 700/28 |
| 2014/0277604 A1* | 9/2014 | Nixon | G05B 19/4185 700/47 |

(Continued)

FOREIGN PATENT DOCUMENTS

| | | |
|---|---|---|
| DE | 102008020381 | 10/2009 |
| WO | 2012035547 | 3/2012 |
| WO | 2015138706 | 9/2015 |

OTHER PUBLICATIONS

"International Search Report (Form PCT/ISA/210) of PCT/IB2019/020004", dated Jun. 14, 2019, pp. 1-4.
(Continued)

*Primary Examiner* — Kenneth M Lo
*Assistant Examiner* — Jonathan Michael Skrzycki
(74) *Attorney, Agent, or Firm* — JCIPRNET (57) ABSTRACT

A method for operating an automation system comprising at least one field device associated to a local control device is provided. The method comprises: controlling an operation of the field device based on control data generated by the local control device; receiving monitoring data describing the controlled operation of the field device from the field device; modifying configuration data of the local control device based on the monitoring data; generating upload data comprising information about the modification of the configuration data and/or about changes in the operation of the field device resulting from the modification of the configuration data; in the local control device and/or in a central control device, deleting, encrypting and/or masking speci-
(Continued)

fied information from the upload data to generate modified upload data; and providing the modified upload data for use by another local control device.

18 Claims, 5 Drawing Sheets

(58) Field of Classification Search
CPC .............. G05B 13/0265; G05B 13/027; G05B 13/0285; G05B 13/029; G06N 5/02
See application file for complete search history.

(56) References Cited

U.S. PATENT DOCUMENTS

| | | |
|---|---|---|
| 2014/0277656 A1 | 9/2014 | Nixon et al. |
| 2016/0098021 A1 | 4/2016 | Zornio et al. |
| 2017/0060104 A1* | 3/2017 | Genma .............. G05B 13/0265 |
| 2017/0185056 A1 | 6/2017 | Satou |
| 2017/0228644 A1 | 8/2017 | Kurokawa |
| 2017/0262772 A1 | 9/2017 | Takigawa et al. |
| 2018/0096261 A1* | 4/2018 | Chu ....................... G06N 7/005 |
| 2020/0311616 A1* | 10/2020 | Rajkumar .............. G06N 3/008 |

OTHER PUBLICATIONS

"Written Opinion of the International Searching Authority (Form PCT/ISA/237) of PCT/IB2019/020004", dated Jun. 14, 2019, pp. 1-9.

* cited by examiner

METHOD FOR OPERATING AN AUTOMATION SYSTEM AND AUTOMATION SYSTEM USING MODIFIED SHARED DATA ACROSS MULTIPLE CONTROL DEVICES

CROSS-REFERENCE TO RELATED APPLICATION

This application is a 371 application of the International PCT application serial no. PCT/IB2019/020004, filed on Mar. 22, 2019, which claims the priority benefits of European Patent Application No. 18168845.8, filed on Apr. 23, 2018. The entirety of the above-mentioned patent application is hereby incorporated by reference herein and made a part of this specification.

The present invention relates to a method for operating an automation system as well as to an automation system and to a central control device for such an automation system.

Automation systems comprising a field device and a local control device for controlling the operation of the field device are known. The local control device may adapt how it controls the operation of the field device according to monitoring data received from the field device, the monitoring data describing the operation of the field device. The operation of the field device can thereby be improved. It is desirable to improve the operation of the field device and of the entire automation system even further.

US 2017/060104 A1 discloses a numerical controller including a machine learning device for performing machine learning of machining condition adjustment of a machine tool.

WO 2015/138706 A1 discloses a distributed big data device for performing a learning analysis and for generating or creating learned knowledge based on the learning analysis, which the device may use to modify its operation to control a process.

US 2017/185056 A1 discloses a controller for controlling a controlled object and including a learning unit. The learning unit is capable of learning a cause of observed electrical noise.

DE 10 2008 020381 A1 discloses an optimization system using anonymized data from a plurality of devices.

WO 2012/035547 A2 discloses a computerized system for controlling, managing and optimizing machine tools based on historical and contemporary operation data of the same and/or other machines that is constantly updated.

It is one object of the present invention to provide an improved method for operating an automation system. A further object of the present invention is the provision of an improved automation system.

Accordingly, the present invention provides a method for operating an automation system and an automation system according to the independent claims. Further aspects of the invention are detailed in the dependent claims.

According to a first aspect, a method for operating an automation system comprising a local control device and at least one field device associated to the local control device is provided. The method comprises the steps of:
  controlling an operation of the field device by the local control device based on control data generated by the local control device;
  in the local control device, receiving monitoring data from the field device, the monitoring data describing the controlled operation of the field device;
  in the local control device, modifying configuration data of the local control device based on the monitoring data, the configuration data being data based on which the local control device generates its control data;
  in the local control device, generating upload data comprising information about the modification of the configuration data and/or about changes in the operation of the field device resulting from the modification of the configuration data;
  in the local control device and/or in a central control device communicatively connected to the local control device, deleting, encrypting and/or masking specified information from the upload data to generate modified upload data; and
  providing the modified upload data and/or part thereof for use by another local control device.

The upload data can be provided to the other local control device for the other local control device to use it. Thereby, information about the modification of the configuration data and the optimization of the operation of the field device elaborated by the local control device can be shared with the other local control device as modified upload data. In particular, a knowledge transfer can occur between the local control device and the other local control device. The operation of the automation system can be simplified because the local control device can share its conclusions on optimizing the associated field device with other local devices.

The other local control device may use the received upload data to adapt its own configuration data and to optimize the operation of the field device it controls. The other local control device does not have to figure out the conclusions provided with the upload data by itself, thereby improving the operation of the automation system further.

The field device can be a machine of a production facility such as a robot arm. In embodiments, the field device is a machine-as-a-service device. The field device can be associated to the local control device such that the local control device can control the field device. In embodiments, several field devices are associated to a same local control device. Alternatively, each field device has a single local control device associated thereto.

The field device can be controlled by the local control device using control data. The control data can include a program according to which the field device should run. For example, the control data can indicate that the field device should first heat a workpiece for a predetermined duration, then bend the workpiece along a predetermined direction by applying a predetermined force.

This control data may be generated or determined by the local control device itself. In detail, the control data can be generated using configuration data stored in the local control device. The configuration data can be determined by the local control device itself from monitoring data received from the field device.

The monitoring data can be data indicating how the field device operates. In particular, the monitoring data is sensor data sensed by sensors of the field device. The monitoring data for example indicates a temperature of the workpiece during or after heating and/or the final shape of the bent workpiece.

The local control device can process the monitoring data received from the field device to adapt the configuration data such as to generate improved control data for improving and optimizing the operation of the field device. In particular, the operation of the field device is improved or optimized such as to increase the number of products produced in a given time period. In embodiments, the local control device is provided with a certain intelligence to adapt the configuration data. The local control device for example adapts the configuration data using a local artificial intelligence algorithm.

Beyond generating control data, the local control device can also generate upload data. The upload data can be indicative of conclusions made by the local control device in optimizing the operation of the associated field device. In particular, the upload data can indicate how the local control device has modified the configuration data and/or how such modifications of the configuration data have affected the operation of the field device. Herein, the expression "modification of the configuration data" indicates the modification performed at the step of modifying the configuration data.

The local control device and/or the central control device can hide part of the upload data by encrypting, masking and/or deleting specified information from the upload data. The resulting upload data is called "modified upload data".

The central control device can be a higher-order control device connected to the local control device. In particular, the central control device provides the local control device with central control information based on which the configuration data can be adapted. In embodiments, the central control device is stored in a cloud. The central control device may be part of the automation system.

Once the anonymization of the upload data has been performed, the resulting modified upload data can be provided for use by another local control device. In particular, the modified upload data is made available to the other local control device. For example, the modified upload data is transferred to the other local control device by the central control device. Herein, "another local control device" and "the other local control device" designate a same entity.

The other local control device may also be part of the automation system. Like the local control device, the other local control device may control another associated field device.

According to an embodiment, the method further comprises:
  in the central control device, determining whether the modified upload data and/or a part thereof should be transmitted to the other local control device based on similarity data indicating similarities between the local control device and the other local control device and/or based on past data indicating whether modified upload data of a certain category should be transmitted to the other local control device; and
  transmitting the modified upload data and/or the part thereof to the other local control device if the central control device determines that the modified upload data and/or a part thereof should be transmitted to the other local control device.

The central control device may select which parts of the modified upload data should be transmitted to the other local control device. This selection can be performed based on similarity data, which is indicative of a resemblance between processes performed by the field device associated with the local control device and the field device associated with the other local control device. This similarity data can be stored in the central control device in advance. In embodiments, the central control device determines the similarity data itself, for example based on upload data or on other data received from the local control device and/or the other local control device.

For example, the similarity data is a ratio of the number of processes that are similar for the operation of the field device associated with the local control device and the operation of the other field device associated with the other local control device to the total number of processes. If this ratio is high, for example above 0.7, the entire modified upload data may be transmitted to the other local control device. If the ratio is medium, for example between 0.5 and 0.7, only part of the modified upload data may be transmitted to the other local control device. Which part of the modified upload data is provided can be selected by the central control device. For low ratios, which are for example smaller than 0.5, no modified upload data may be transmitted to the other local control device at all.

Past data is data indicative of past experience of sharing modified upload data with the other local control device. It may include feedback information received from the other local control device upon receiving previous modified upload data and/or information from technicians and/or experts inserted into a database of the central control device.

According to a further embodiment, the method further comprises:
  receiving the modified upload data and/or part thereof by the other local control device;
  modifying configuration data of the other local control device based on the received modified upload data and/or part thereof;
  in the other local control device, generating control data for controlling an operation of another field device associated with the other local control device based on the modified configuration data of the other local control device; and
  controlling the operation of the other field device by the other local control device based on the control data generated in the other local control device.

Upon reception of the modified upload data and/or part thereof, the other local control device can use all or part of the received data to modify how it controls the other field device associated thereto. In embodiments, the other local control device or a user thereof examines the received modified upload data to exclude any harmful processes and/or to estimate a possible gain and loss of productivity of using the modified upload data. The other local control device may further decide whether to use the received modified upload data or not.

The other local control device adapts its configuration data based on the received modified upload data and accordingly generates modified control data for controlling its associated field device. The operation of the field device associated with the other local control device can be optimized using the received modified upload data, thereby facilitating the operation of the automation system and improving the operation of the field device associated with the other local control device.

According to a further embodiment, the local control device modifies the configuration data using a local artificial intelligence algorithm, in particular using a machine learning algorithm trained with the monitoring data. The machine learning algorithm can be a neural network algorithm.

According to a further embodiment, the upload data comprises information about the machine learning algorithm trained and/or used by the local control device. In particular, by sharing the upload data and/or modified upload data with the other local control device, the local control device shares information relating to its machine learning algorithm. The other control device may reuse parts of the machine learning algorithm provided with the modified upload data. By implementing the parts of the machine learning algorithm received with the modified upload data, the other control device in particular avoids training its own machine learning algorithm, which is very time consuming. An operation of the field device associated with the other local control device may thereby be improved time-efficiently.

According to a further embodiment, the method further comprises:

in the other local control device, generating feedback data indicating whether the received modified upload data was useful for the other local control device in improving the operation of the other field device associated with the other local control device;

transmitting the feedback data to the central control device; and incorporating the feedback data into the past data of the central control device.

The feedback data for example indicates that the operation of the other field device improved, remained unchanged or decreased upon using the modified upload data. The feedback data may also indicate that the other local control device did not use the received modified upload data and/or why it did not use it.

According to a further embodiment, the specified information includes an identity of the field device and/or local control device, an identification of the operation of the field device and/or an indication about an operation environment of the field device and/or local control device.

In particular, the specified information is all the information in the upload data that allows recognizing which local control device generated the upload data and/or which field device is associated to the local control device that generated the upload data. The specified information can be the part of the upload data that should not be shared with the other local control data. The specified information can for example include an ID of the local control device and/or of the associated field device, or an information on the product produced by the field device. The local control device and/or the central control device may thus anonymize the upload data.

According to a further embodiment, the local control device and the other local control device are local control devices operated exclusively by different entities, in particular firms. In particular, the local control device and the other local control device belong to different firms. Making the specified information not available to the other entity or firm, in particular by deleting, masking and/or encrypting the specified information, is particularly useful in the case in which the local control device and the other control device belong to different entities and/or firms because it can thereby be avoided that any sensitive information is transmitted to a local control device from a different firm as the (modified) upload data. Thereby, the security of the local control device can be guaranteed while still sharing shareable information with the other local control device and improving the operation of the field device associated to the latter.

In embodiments, the local control device and the other local control device are located at different locations, for example at different sites.

According to a further embodiment, the central control device is located in a location that is different from the locations of the local control device and the other local control device are located or the central control device is located at the same location as the local control device or as the other local control device.

According to a second aspect, a computer program product comprising a program code for executing and/or controlling the method according to the first aspect or according to an embodiment of the first aspect when run on at least one computer is provided.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

According to a third aspect, an automation system is provided. The automation system comprises:

a local control device;

another local control device; and at least one field device associated to the local control device;

wherein the local control device comprises:

a control unit for controlling an operation of the field device based on control data generated by the local control device;

a reception unit for receiving monitoring data from the field device, the monitoring data describing the controlled operation of the field device;

a modification unit for modifying configuration data of the local control device based on the monitoring data, the configuration data being data based on which the local control device generates its control data; and a generation unit for generating upload data comprising information about the modification of the configuration data and/or about changes in the operation of the field device resulting from the modification of the configuration data;

wherein the automation system further comprises:

a protection unit for deleting, encrypting and/or masking specified information from the upload data to generate modified upload data; and a provision unit for providing the modified upload data and/or part thereof for use by another local control device.

According to an embodiment, the automation system is configured to perform the method according to the first aspect or according to an embodiment of the first aspect. The embodiments and features described with reference to the method according to the first aspect or according to an embodiment of the first aspect apply mutatis mutandis to the automation system according to the third aspect.

According to a further embodiment, the automation system further comprises a further local control device for receiving the modified upload data and/or part thereof. In particular, the central control device is connected to several other local control devices and can transmit the modified upload data to every single one of these other local control devices.

According to a further embodiment, the automation system further comprises a central control device, the central control device being communicatively connected to the local control device and to the other local control device and comprising the protection unit, the provision unit and/or a determination unit for determining whether the modified upload data should be transmitted to the other local control device based on similarity data indicating similarities between the local control device and the other local control device and/or based on past data indicating whether modified upload data of a certain category should be transmitted to the other local control device.

According to a fourth aspect, a central control device for the automation system according to the third aspect or according to an embodiment of the third aspect for being communicatively connected to a local control device and to another local control device is provided. The central control device comprises:

an upload data reception unit for receiving upload data and/or modified upload data from the local control device;

a processing unit for processing the received upload data and/or the received modified upload data using a central artificial intelligence algorithm for generating the modified upload data based on the received upload data and/or for determining whether the modified upload data and/or a part thereof should be transmitted to the other local control device; and a transmission unit for transmitting the modified upload data and/or a part thereof to the other local control device.

According to an embodiment, the processing unit is configured to generate the modified upload data by deleting, encrypting and/or masking specified information from the received upload data, and/or wherein the processing unit is configured to determine whether the modified upload data should be transmitted to the other local control device based on similarity data indicating similarities between the local control device and the other local control device and/or based on past data indicating whether modified upload data of a certain category should be transmitted to the other local control device.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Further embodiments, features and advantages of the present invention will become apparent from the subsequent description and dependent claims, taken in conjunction with the accompanying drawings, in which:

In the Figures, like reference numerals designate like or functionally equivalent elements, unless otherwise indicated.

Figure 1:
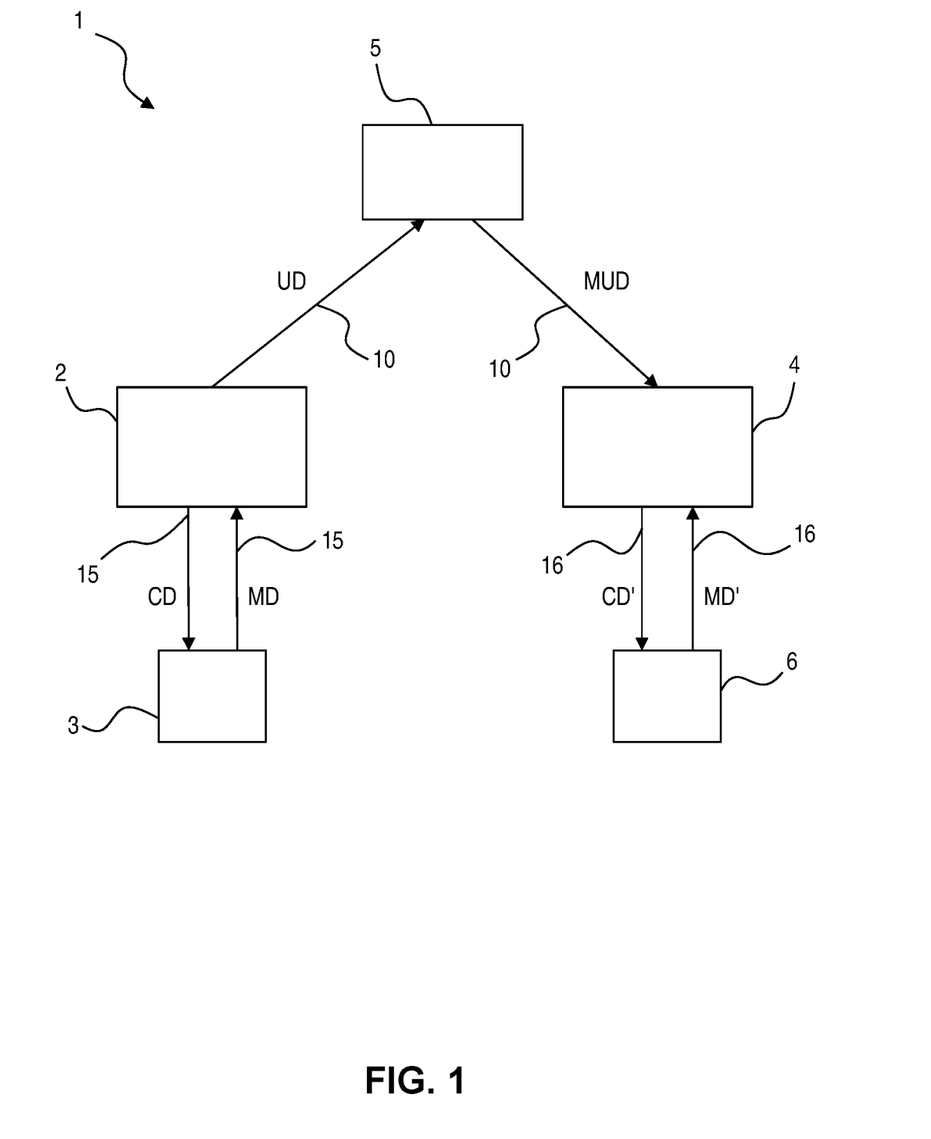
FIG. 1 shows an automation system according to a first embodiment.

FIG. 1 shows an automation system 1 according to a first embodiment. The automation system 1 comprises a local control device 2, a field device 3, a central control device 5, another local control device 4 and another field device 6. The local control device 2 and the other local control device 4 communicate with the central control device 5 through a wireless communication channel 10.

The field device 3 is associated to the local control device 2. The field device 3 is a machine of a production system that sticks labels to bottles. The field device 3 is connected to the local control device 2 through a cable 15. The local control device 2 and the field device 3 are operated by another entity than the other local control device 4 and the other field device 6, as they respectively belong to different firms.

The other field device 6 is associated to the other local control device 4. The other field device 6 is also machine of a production system that sticks labels to bottles, but it does not belong to the same firm as the field device 3. The other field device 6 is connected to the other local control device 4 through a cable 16. The field device 3 and the other field device 6 are both machine-as service devices.

Figure 2:
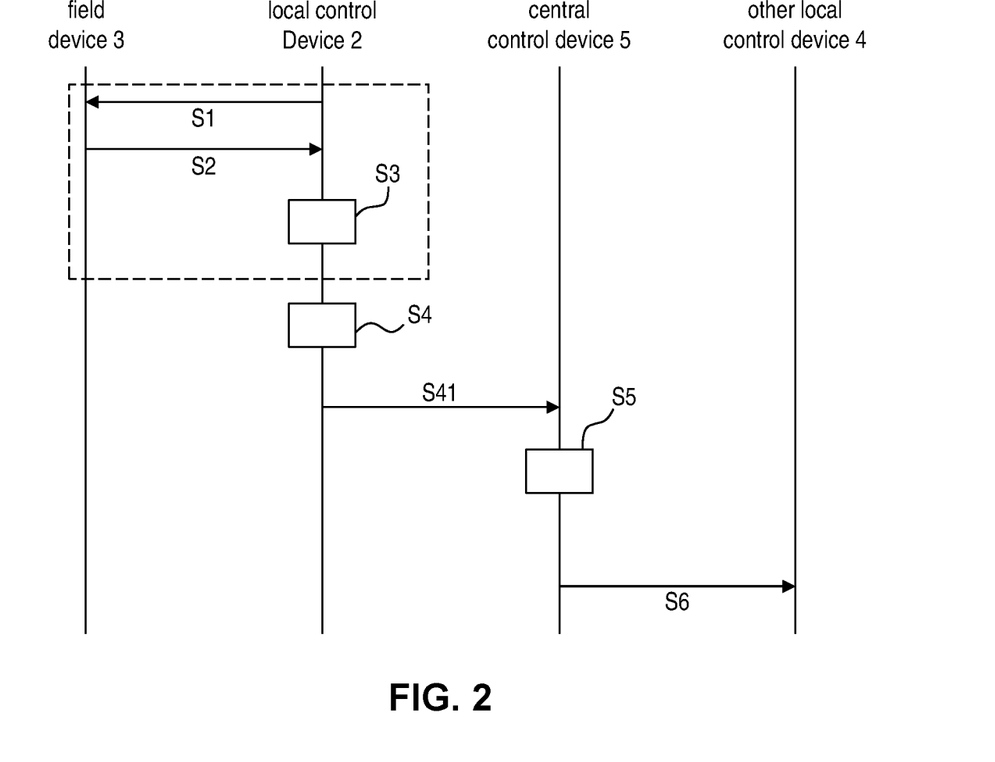
FIG. 2 shows a method for operating an automation system according to a first embodiment.
Figure 3:
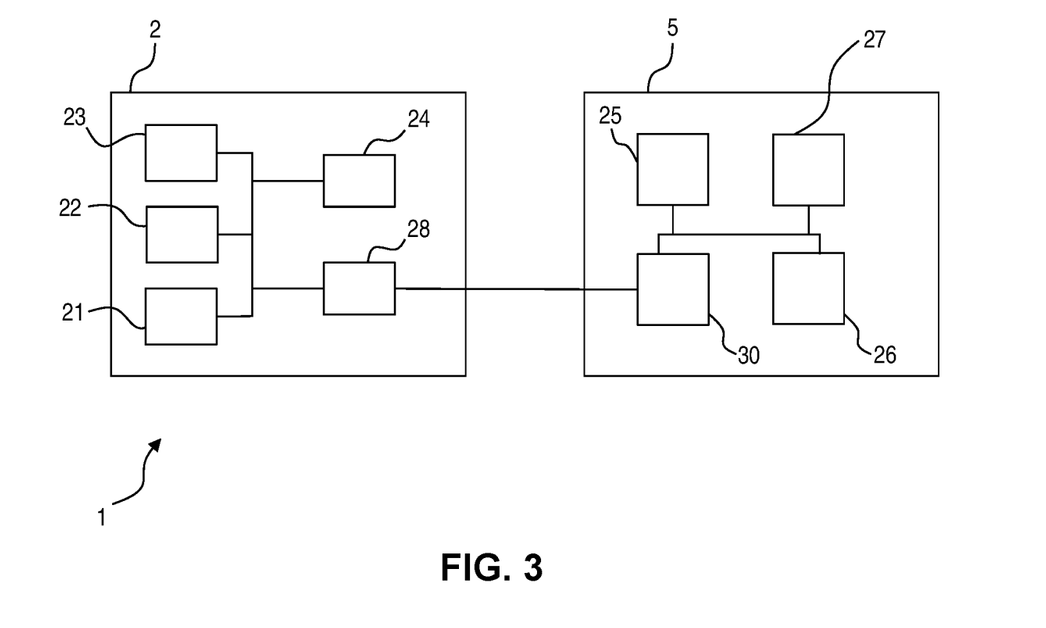
FIG. 3 shows a local control device and a central control device of the automation system according to the first embodiment.

The automation system 1 can be operated according to a method for operating the automation system 1. Such a method for operating the automation system is shown in FIG. 2. In the following, the operation of the automation system 1 will be described in view of FIGS. 1, 2 and 3, wherein FIG. 3 shows a more detailed view of the local control device 2 and of the central control device 5.

In a step S1, the local control device 2 controls the operation of the associated field device 3 using control data CD. The control of the operation of the field device 3 is performed by a control unit 21 of the local control device 2 (see FIG. 3). The control data CD is generated by the local control device 2 based on configuration data. The control data CD is transmitted from the local control device 2 to the associated field device 3 through the cable 15. For example, the control data CD indicates that the field device 3 should stick the labels to the bottles by applying a predetermined amount of glue to the label, by pressing the label onto the bottle with a predetermined force and by heating the glue at a predetermined temperature for it to dry. The field device 3 then operates in accordance with the received control data CD. In detail, it sticks the labels to the bottles as instructed by the local control device 2.

In a step S2, the local control device 2 receives monitoring data MD from the field device 3 through a reception unit 22. The monitoring data MD is data sensed by sensors of the field device 3 and indicative of the operation of the field device 3. The monitoring data MD for example includes photos of the labels stuck to the bottles by the field device 3. The monitoring data MD is transmitted to the local control device 2 through the cable 15.

In a step S3, the configuration data of the local control device 2 according to which the control data CD is generated is modified based on the monitoring data MD by a modification unit 23 of the local control device 2. For example, the configuration data is changed such as to generate control data CD instructing the field device 3 to use less glue if the photos of the stuck labels received as the monitoring data MD are showing glue stains on the bottles around the label.

The configuration data is modified using an artificial intelligence algorithm. The artificial intelligence algorithm is a neural network algorithm trained with the monitoring data MD received from the field device 3.

In embodiments, the steps S1, S2 and S3 (indicated in a dashed rectangle in FIG. 2) are iteratively performed.

In a step S4, the local control device 2, in particular a generation unit 24 thereof, generates upload data UD. The upload data UD indicates how the configuration data was modified in step S3 and how the field device 3 reacted to this modification in a subsequent step S2.

In a step S41, the upload data UD is transmitted from a local interface 28 of the local control device 2 to the central control device 5 through the wireless communication channel 10. The central control device 5 receives the upload data UD via a central interface 30.

In a step S5, the central control device 5, in particular a protection unit 25 thereof, deletes, encrypts and/or masks specified information from the upload data UD such as to generated modified upload data MUD. The specified information is information allowing identification of the local control device 2 and of the field device 3. In other words, in step S5, the central control device 5 performs an anonymization of the upload data UD.

Figure 4:
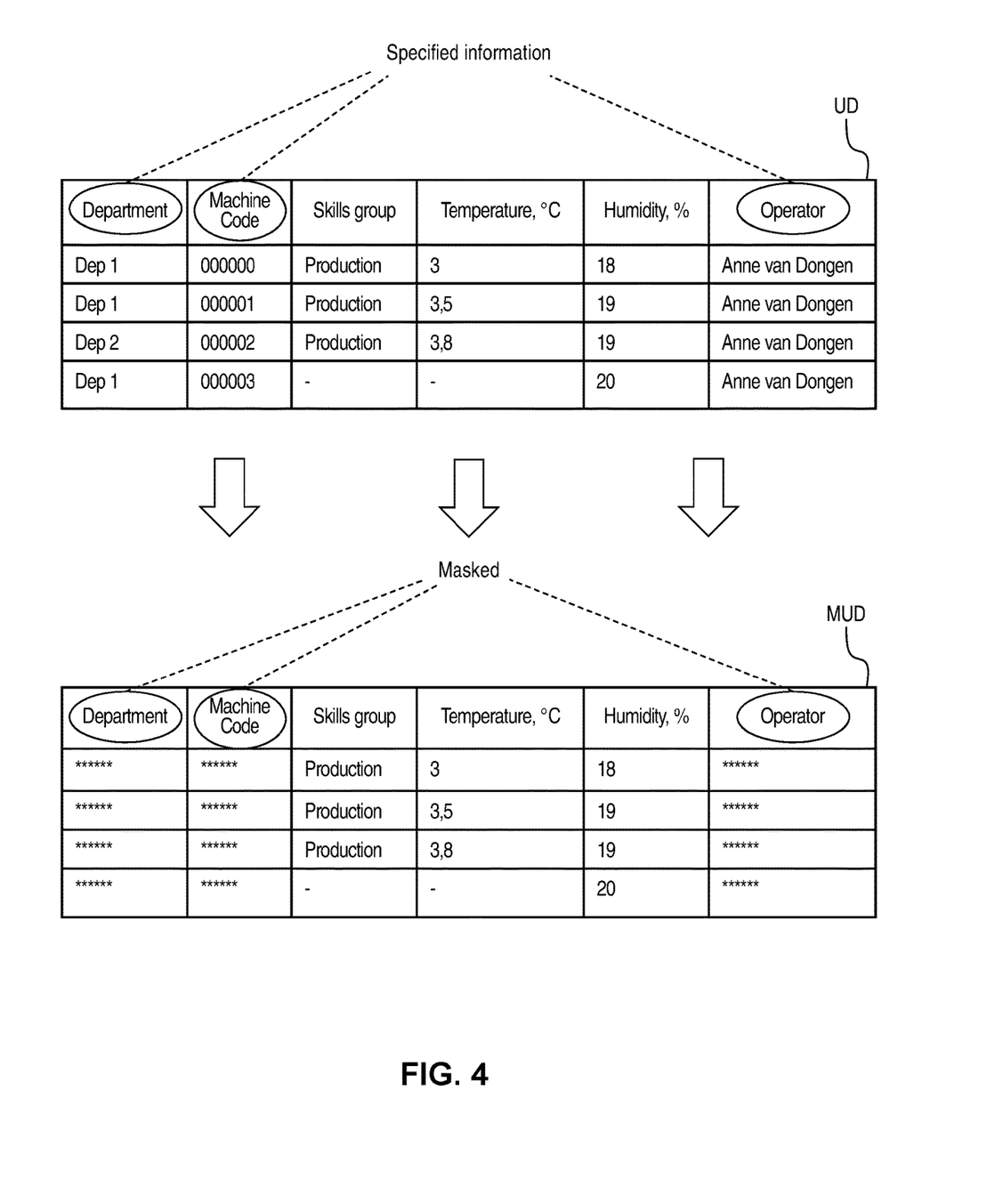
FIG. 4 shows an example of upload data and modified upload data.

An example of such an anonymization of the upload data UD is shown in FIG. 4. In FIG. 4, the upper table shows the upload data UD as received by the central control device 5. It includes a department number, a machine code and an operator name as specified information. Further, the upload data UD includes a skills group information, a temperature and a humidity as non-specified information.

The bottom table of FIG. 4 shows the modified upload data MUD generated by the central control device 5 in step S5. As shown in FIG. 4, the specified information (department number, machine code and operator name) has been masked in the modified upload data MUD. The non-specific information (skills group information, temperature and humidity) has not been modified as compared to the upload data UD.

In embodiments, the step S5 is entirely or partially performed by the local control device 2. In this case, the step S41 may be left out.

Next, in a step S6, the modified upload data MUD is provided for use by the other local control device 4. In particular, a provision unit 26 of the central control device 5 transmits the modified upload data MUD to the other local control device 4.

Figure 5:
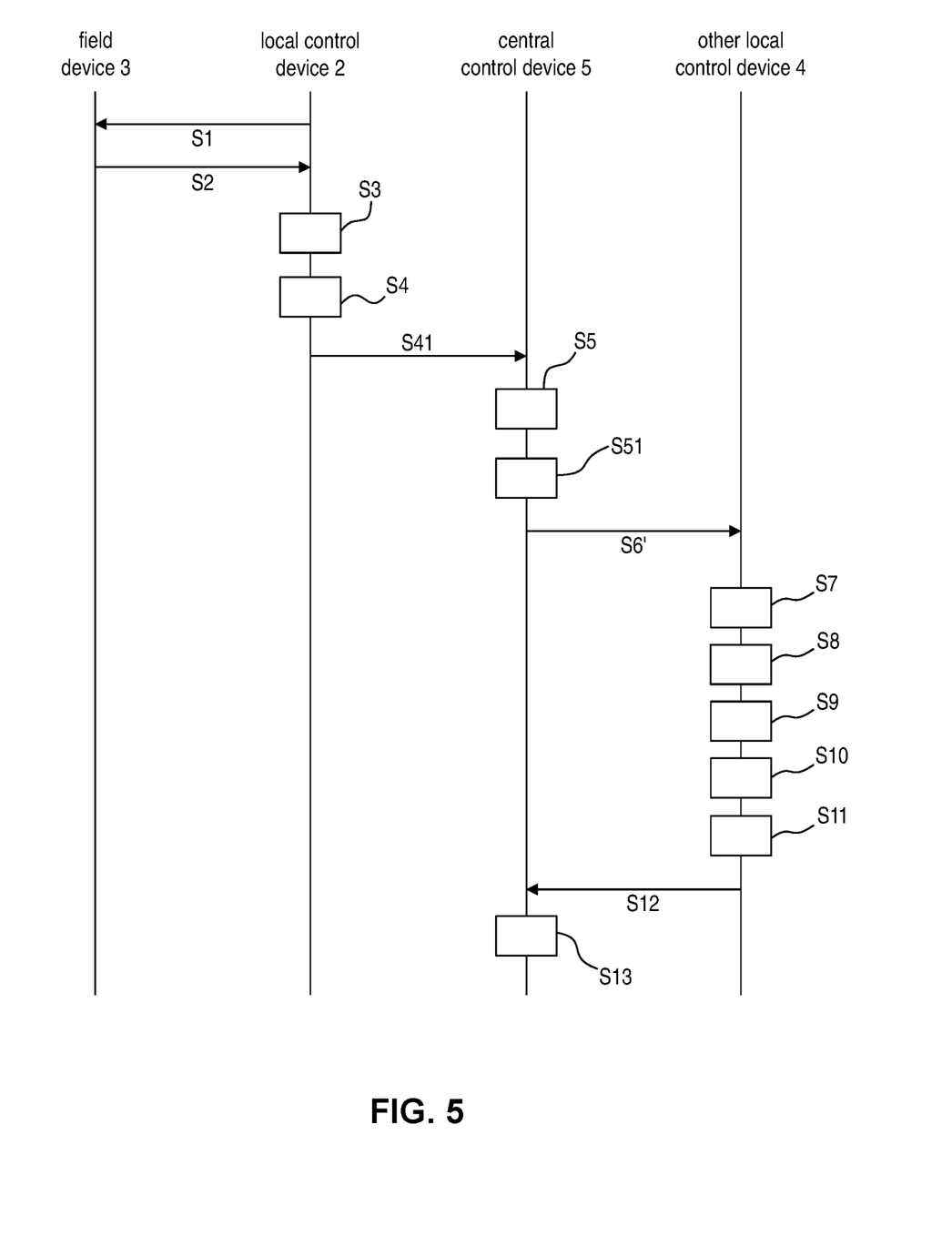
FIG. 5 shows a method for operating an automation system according to a second embodiment.

FIG. 5 shows an alternative method for operating the automation system 1. In the following, only the differences between the method according to the first embodiment (FIG. 2) and the method according to the second embodiment (FIG. 5) will be described in detail. The steps S1 to S5 and S41 are identical to those described in view of FIG. 2.

In a step S51, the central control device 5, in particular a determination unit 27 thereof, determines whether the modified upload data MUD and/or part thereof should be transmitted to the other local control device 4. To make this decision, the central control device 5 considers similarity data and past data. The similarity data is indicative of how similar the processes performed by the field device 3 and by the other field device 6 are. In the present case, the similarity data indicates a high similarity between said processes.

Further, the past data indicates whether modified upload data MUD that was previously transferred to the other local control device 4 was useful for the other local control device 4. In the present example, the past data indicates that previously shared modified upload data MUD was partly useful.

To determine whether the modified upload data MUD and/or part thereof should be transmitted to the other local control device 4, the central control device 5 makes use of a central artificial intelligence algorithm. This central artificial intelligence algorithm is a central machine learning algorithm trained using the similarity data and the past data.

In the present example, the central control device 5 determines in step S51 that the modified upload data MUD should be partly transmitted to the other local control device 4 in view of the similarity data and past data. If the similarity data or the past data were different, the central control device 5 could choose to transfer the modified upload data MUD in its entirety or to transfer none of it at all.

In a step S6', part of the modified upload data MUD is transferred to other local control device 4. Step S6' is only a slight modification of step S6 described above with reference to FIG. 2.

In a step S7, the other local control device 4 receives the modified upload data MUD.

In a step S8, the other local control device 4 modifies its own configuration data. Similarly to the configuration data of the local control device 2, the configuration data of the other local control device 4 is used by the other local control device 4 to generate control data CD' for controlling an operation of the field device 6 associated to the other local control device 4.

In a step S9, the other local control device 4 generates control data CD' using its configuration data modified in step S8. In a step S10, the other local control device 4 controls the associated other field device 6 using the control data CD' generated in step S10.

The other field device 6 is thus controlled under consideration of the modified upload data MUD received by the other local control device 4. The operation of the automation system 1 is improved because the other local control device 4 can use the information provided with the modified upload data MUD without having to generate its own conclusions on the operation of the associated field device 6. Since specified information is hidden in the modified upload data MUD, no firm-specific or sensitive information is shared between different firms. The modified upload data MUD therefore allows a knowledge transfer between the local control device 2 and the other control device 4.

In a step S11, the other local control device 4 generates feedback data indicating whether the received modified upload data MUD was useful in improving the operation of the other field device 6. The feedback data is generated based on monitoring data MD' received by the other local control device 4 from the associated other field device 6.

In a step S12, the feedback data is transmitted to the central control device 5. The central control device 5 uses the feedback data to update its past data and/or to train its central machine learning algorithm in a step S13. This allows to improve how future decision are made at step S51.

Figure 6:
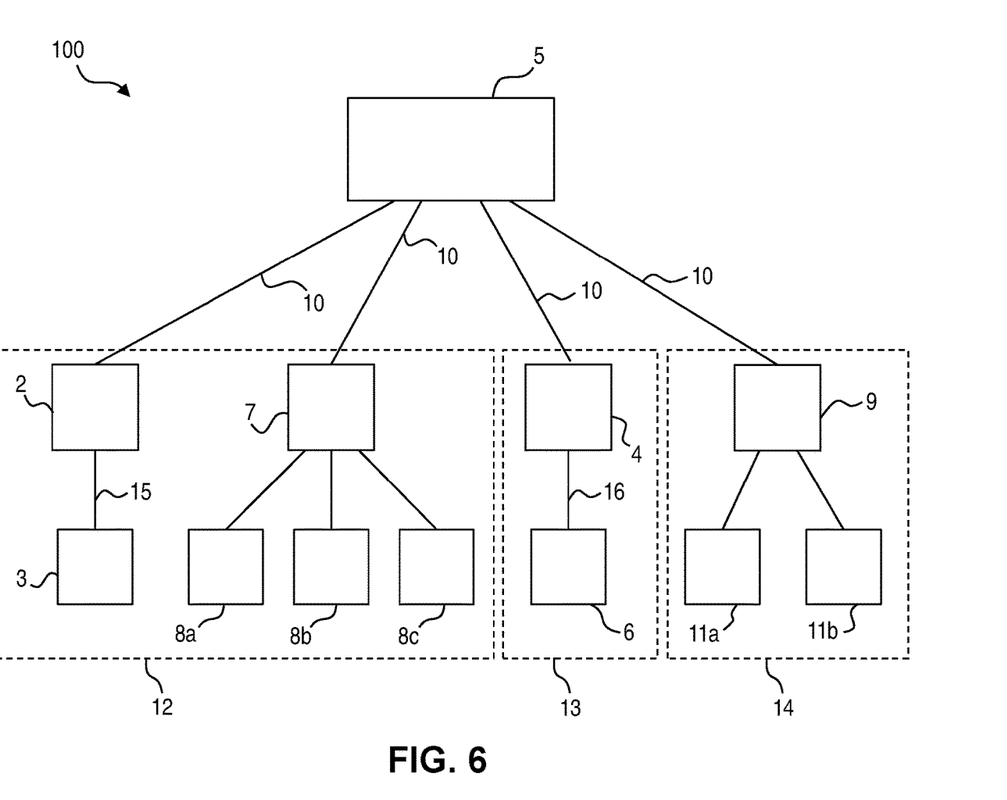
FIG. 6 shows an automation system according to a second embodiment.

FIG. 6 shows an automation system 100 according to a second embodiment. Like the automation system 1 according to the first embodiment, the automation system 100 according to the second embodiment is operable according to the methods described in view of FIGS. 2 and 5.

The automation system 100 comprises all elements of the automation system 1. Beyond those elements, it comprises a further other local control device 7 having three other field devices 8*a*-8*c* associated thereto and another local control device 9 having two other field devices 11*a*, 11*b* associated thereto.

The local control devices 2 and 7 as well as the field devices 3, 8*a*-8*c* associated thereto belong to a first firm 12. The local control device 4 as well as the field device 6 associated thereto belong to a second firm 13. Finally, the local control device 9 as well as the field devices 11*a*, 11*b* associated thereto belong to a third firm 14. The location of the three firms 11-13 is different from one another.

All local control devices 2, 4, 7, 9 are wirelessly connected to central control device 5 through the wireless communication channel 10. The automation system 100 can be operated in accordance with the above described methods to provide any of the other local control devices 4, 7 and 9 with modified upload data MUD or with part thereof, as determined by the central control device 5.

In particular, the central control device 5 manages the transmission of information from one local control device 2, 4, 7, 8 to another as modified upload data MUD. Since the specified information is hidden from the modified upload data, no sensitive information is transmitted from one firm 12, 13, 14 to another. In the automation system 100, the plurality of local control devices 2, 4, 7, 8 share modified upload data MUD with one another, thereby improving the operation of the individual field devices 3, 6, 8a-8c, 11a, 11b and of the entire automation system 100.

Figure 7:
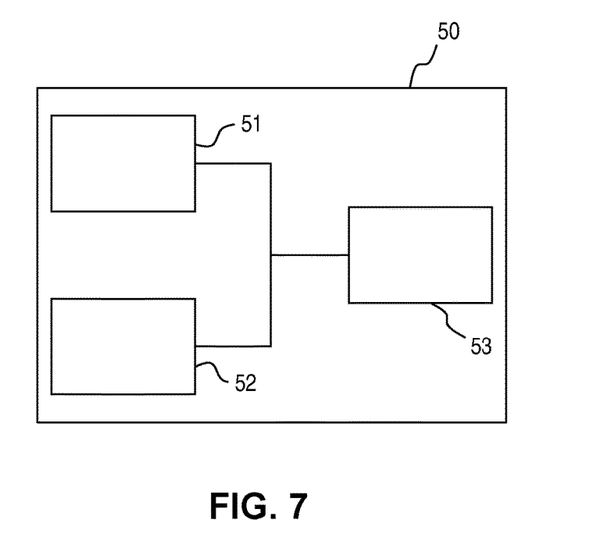
FIG. 7 shows a central control device according to an embodiment.

FIG. 7 shows a central control device 50 according to an embodiment. The central control device 50 can replace the central control device 5 of the automation system 1, 100. It comprises an upload data reception unit 51 for receiving upload data UD and/or modified upload data MUD from the local control device 2; a processing unit 52 for processing the received upload data UD and/or the received modified upload data MUD using a central artificial intelligence algorithm for generating the modified upload data MUD based on the received upload data UD and/or for determining whether the modified upload data MUD and/or a part thereof should be transmitted to the other local control device 4; and a transmission unit 53 for transmitting the modified upload data MUD and/or a part thereof to the other control device 4 connected to each other by an internal bus 54.

Although the present invention has been described in accordance with preferred embodiments, it is obvious for the person skilled in the art that modifications are possible in all embodiments. For example, the number and arrangement of the local control devices and associated field devices are not limited to the ones describes above. Further, the type of information shared with the modified upload data can be adapted to the application environment. For example, it is possible to share information about the local machine learning algorithm as part of the modified upload data MUD. The bottle labelling is only an example of a function that can be performed by the field devices. Alternatively, the field devices can be used to produce any object, for example a printed circuit board. Moreover, instead of masking the specified information from the upload data as shown in FIG. 4, it is also possible to encrypt or delete said specific information.

The invention claimed is:

1. A method for operating an automation system (1, 100) comprising a local control device (2) and at least one field device (3) associated to the local control device (2), the method comprising the steps of:
   controlling (S1) an operation of the field device (3) by the local control device (2) based on control data (CD) generated by the local control device (2);
   in the local control device (2), receiving (S2) monitoring data (MD) from the field device (3), the monitoring data (MD) describing the controlled operation of the field device (3);
   in the local control device (2), modifying (S3) configuration data of the local control device (2) based on the monitoring data (MD), the configuration data being data based on the control data (CD) generated by the local control device (2);
   in the local control device (2), generating (S4) upload data (UD) comprising information about the modification of the configuration data and/or about changes in the operation of the field device (3) resulting from the modification of the configuration data;
   in the local control device (2) and/or in a central control device (5) communicatively connected to the local control device (2), deleting, encrypting and/or masking (S5) specified information from the upload data (UD) to generate modified upload data (MUD);
   in the central control device (5), determining (S51) whether the modified upload data (MUD) and/or a part thereof should be transmitted to an other local control device (4) based on similarity data indicating a ratio of the number of processes that are similar for an operation of the field device (3) associated with the local control device (2) and an operation of an other field device (6) associated with the other local control device (4) to the total number of processes and based on past data indicating whether previous modified upload data (previous MUD) of a certain category have been transmitted to the other local control device (4), wherein the past data comprises data indicative of past experience of sharing the previous modified upload data (previous MUD) with the other local control device (4), the past data comprises previous feedback information received from the other local control device (4) upon the other local control device (4) receiving the previous modified upload data (previous MUD) and the central control device (5) receiving previous information from technicians inserted into a database of the central control device (5);
   transmitting (S6') the modified upload data (MUD) and/or the part thereof to the other local control device (4) if the central control device (5) determines that the modified upload data (MUD) and/or a part thereof should be transmitted to the other local control device (4);
   in the other local control device (4), generating (S11) feedback data indicating whether the received modified upload data (received MUD) was useful for the other local control device (4) in improving the operation of the other field device (6) associated with the other local control device (4);
   transmitting (S12) the feedback data to the central control device (5); and
   incorporating (S13) the feedback data into the past data of the central control device (5).

2. The method according to claim 1, further comprising receiving (S7) the modified upload data (MUD) and/or part thereof by the other local control device (4);
   modifying (S8) configuration data of the other local control device (4) based on the received modified upload data (received MUD) and/or part thereof;
   in the other local control device (4), generating (S9) control data (CD') for controlling an operation of the other field device (6) associated with the other local control device (4) based on the modified configuration data of the other local control device (4); and
   controlling (S10) the operation of the other field device (6) by the other local control device (4) based on the control data (CD') generated in the other local control device (4).

3. The method according to claim 2, wherein the local control device (2) modifies the configuration data using a local artificial intelligence algorithm, in particular using a machine learning algorithm trained with the monitoring data (MD).

4. The method according to claim 3, wherein the upload data (UD) comprises information about the machine learning algorithm trained and/or used by the local control device (2).

5. The method according to claim 1, wherein the local control device (2) modifies the configuration data using a local artificial intelligence algorithm, in particular using a machine learning algorithm trained with the monitoring data (MD).

6. The method according to claim 5, wherein the upload data (UD) comprises information about the machine learning algorithm trained and/or used by the local control device (2).

7. The method according to claim 1, wherein the specified information includes an identity of the field device (3) and/or local control device (2), an identification of the operation of the field device (3) and/or an indication about an operation environment of the field device (3) and/or local control device (2).

8. The method according to claim 1, wherein the local control device (2) and the other local control device (4) are local control devices operated exclusively by different firms.

9. A non-transitory computer readable storage medium comprising a program code for executing and/or controlling a method for operating an automation system (1, 100) comprising a local control device (2) and at least one field device (3) associated to the local control device (2), the method comprising the steps of:
- controlling (S1) an operation of the field device (3) by the local control device (2) based on control data (CD) generated by the local control device (2);
- in the local control device (2), receiving (S2) monitoring data (MD) from the field device (3), the monitoring data (MD) describing the controlled operation of the field device (3);
- in the local control device (2), modifying (S3) configuration data of the local control device (2) based on the monitoring data (MD), the configuration data being data based on the control data (CD) generated by the local control device (2);
- in the local control device (2), generating (S4) upload data (UD) comprising information about the modification of the configuration data and/or about changes in the operation of the field device (3) resulting from the modification of the configuration data;
- in the local control device (2) and/or in a central control device (5) communicatively connected to the local control device (2), deleting, encrypting and/or masking (S5) specified information from the upload data (UD) to generate modified upload data (MUD);
- in the central control device (5), determining (S51) whether the modified upload data (MUD) and/or a part thereof should be transmitted to an other local control device (4) based on similarity data indicating a ratio of the number of processes that are similar for an operation of the field device (3) associated with the local control device (2) and an operation of an other field device (6) associated with the other local control device (4) to the total number of processes and based on past data indicating whether previous modified upload data (previous MUD) of a certain category have been transmitted to the other local control device (4), wherein the past data comprises data indicative of past experience of sharing the previous modified upload data (previous MUD) with the other local control device (4), the past data comprises previous feedback information received from the other local control device (4) upon the other local control device (4) receiving the previous modified upload data (previous MUD) and the central control device (5) receiving previous information from technicians inserted into a database of the central control device (5);
- transmitting (S6') the modified upload data (MUD) and/or the part thereof to the other local control device (4) if the central control device (5) determines that the modified upload data (MUD) and/or a part thereof should be transmitted to the other local control device (4);
- in the other local control device (4), generating (S11) feedback data indicating whether the received modified upload data (received MUD) was useful for the other local control device (4) in improving the operation of the other field device (6) associated with the other local control device (4);
- transmitting (S12) the feedback data to the central control device (5); and
- incorporating (S13) the feedback data into the past data of the central control device (5).

10. An automation system (1, 100) comprising:
- a local control device (2);
- an other local control device (4);
- at least one field device (3) associated to the local control device (2); and
- a central control device (5) communicatively connected to the local control device (2) and to the other local control device (4);

wherein the local control device (2) comprises:
- a control unit (21) for controlling an operation of the field device (3) based on control data (CD) generated by the local control device (2);
- a reception unit (22) for receiving monitoring data (MD) from the field device (3), the monitoring data (MD) describing the controlled operation of the field device (3);
- a modification unit (23) for modifying configuration data of the local control device (2) based on the monitoring data (MD), the configuration data being data based on the control data (CD) generated by the local control device (2); and
- a generation unit (24) for generating upload data (UD) comprising information about the modification of the configuration data and/or about changes in the operation of the field device (3) resulting from the modification of the configuration data;

wherein the automation system (1, 100) further comprises:
- a protection unit (25) for deleting, encrypting and/or masking specified information from the upload data (UD) to generate modified upload data (MUD);

wherein
the central control device (5) is configured to determine whether the modified upload data (MUD) and/or a part thereof should be transmitted to the other local control device (4) based on similarity data indicating a ratio of the number of processes that are similar for an operation of the field device (3) associated with the local control device (2) and an operation of an other field device (6) associated with the other local control device (4) to the total number of processes and based on past data indicating whether previous modified upload data (previous MUD) of a certain category have been transmitted to the other local control device (4), wherein the past data comprises data indicative of past experience of sharing the previous modified upload data (previous MUD) with the other local control device (4), the past data comprises previous feedback information received from the other local control device (4) upon the other local control device (4) receiving the previous modified upload data (previous MUD) and the central control device (5) receiving previous information from technicians inserted into a database of the central control device (5);

the central control device (5) is configured to transmit the modified upload data (MUD) and/or the part thereof to the other local control device (4) if the central control device (5) determines that the modified upload data (MUD) and/or a part thereof should be transmitted to the other local control device (4);

the other local control device (4) is configured to generate feedback data indicating whether the received modified upload data (received MUD) was useful for the other local control device (4) in improving the operation of the other field device (6) associated with the other local control device (4);

the other local control device (4) is configured to transmit the feedback data to the central control device (5); and the central control device (5) is configured to incorporate the feedback data into the past data of the central control device (5).

11. The automation system according to claim 10, wherein the other local control device (4) comprises:

receiving (S7) the modified upload data (MUD) and/or part thereof;

modifying (S8) configuration data of the other local control device (4) based on the received modified upload data (received MUD) and/or part thereof;

generating (S9) control data (CD') for controlling an operation of the other field device (6) associated with the other local control device (4) based on the modified configuration data of the other local control device (4); and controlling (S10) the operation of the other field device (6) based on the control data (CD') generated in the other local control device (4).

12. The automation system according to claim 10, comprising a further local control device (7, 9) for receiving the modified upload data (MUD) and/or part thereof.

13. The automation system according to claim 10, wherein the central control device (5) comprises the protection unit (25), the provision unit (26) and/or a determination unit (27) for determining whether the modified upload data (MUD) should be transmitted to the other local control device (4) based on the similarity data and/or based on the past data.

14. The automation system according to claim 10, wherein the local control device (2) modifies the configuration data using a local artificial intelligence algorithm, in particular using a machine learning algorithm trained with the monitoring data (MD).

15. The automation system according to claim 14, wherein the upload data (UD) comprises information about the machine learning algorithm trained and/or used by the local control device (2).

16. The automation system according to claim 10, wherein the specified information includes an identity of the field device (3) and/or local control device (2), an identification of the operation of the field device (3) and/or an indication about an operation environment of the field device (3) and/or local control device (2).

17. The automation system according to claim 10, wherein the local control device (2) and the other local control device (4) are local control devices operated exclusively by different firms.

18. A central control device (5, 50) for an automation system (1, 100) the central control device (5, 50) being communicatively connected to a local control device (2) and to an other local control device (4), the central control device (5, 50) comprising:

an upload data reception unit (51) for receiving upload data (UD) and/or modified upload data (MUD) from the local control device (2);

a processing unit (52) for processing the received upload data (received UD) and/or the received modified upload data (received MUD) using a central artificial intelligence algorithm for generating generated modified upload data (generated MUD) based on the received upload data (received UD) and/or for determining whether the received modified upload data (received MUD) or the generated modified upload data (generated MUD) and/or a part thereof should be transmitted to the other local control device (4); and a transmission unit (53) for transmitting the received modified upload data (received MUD) or the generated modified upload data (generated MUD) and/or a part thereof to the other control device (4), wherein the processing unit (52) is configured to generate the generated modified upload data (generated MUD) by deleting, encrypting and/or masking specified information from the received upload data (received UD), the processing unit (52) is configured to determine whether the generated modified upload data (generated MUD) should be transmitted to the other local control device (4) based on similarity data indicating a ratio of the number of processes that are similar for an operation of a field device (3) associated with the local control device (2) and an operation of an other field device (6) associated with the other local control device (4) to the total number of processes and based on past data indicating whether previous modified upload data (previous MUD) of a certain category have been transmitted to the other local control device (4), wherein the past data comprises data indicative of past experience of sharing the previous modified upload data (previous MUD) with the other local control device (4), the past data comprises previous feedback information received from the other local control device (4) upon the other local control device (4) receiving the previous modified upload data (previous MUD) and the central control device (5, 50) receiving previous information from technicians inserted into a database of the central control device (5);

the processing unit (52) is configured to receive feedback data generated by the other local control device (4) indicating whether the received modified upload data (received MUD) was useful for the other local control device (4) in improving the operation of the other field device (6) associated with the other local control device (4); and the processing unit (52) is configured to incorporate the feedback data into the past data of the central control device (5, 50).

* * * * *